United States Patent [19]
Heinz et al.

[11] 3,758,091
[45] Sept. 11, 1973

[54] RESILIENT END ABUTMENT

[75] Inventors: Winfried Heinz, Accum; Wilhelm Schwartz; Henricus Tromp, both of Wilhelmshaven, all of Germany

[73] Assignee: Fried Krupp Gesellschaft mit beschrankter Haftung, Essen, Germany

[22] Filed: Aug. 2, 1971

[21] Appl. No.: 167,945

[30] Foreign Application Priority Data
Aug. 13, 1970 Germany............P 20 40 204.4

[52] U.S. Cl............................................. 267/65 R
[51] Int. Cl.............................................. F16f 1/37
[58] Field of Search.................... 267/65, 152, 140, 267/141; 293/60, 1

[56] References Cited
UNITED STATES PATENTS
3,610,609  10/1971  Sobel................................. 293/60

*Primary Examiner*—James B. Marbert
*Attorney*—Walter Becker

[57] ABSTRACT

A resilient abutment unit, especially for use in connection with motor vehicles, according to which a pushrod equipped piston is guided in a cylinder comprising resilient spring means, while the piston has at least its circumferential cylinder engaging surface provided with resiliently compressible material so that said piston will be able in response to shocks acting eccentrically thereon to occupy an inclined position in the cylinder.

5 Claims, 2 Drawing Figures

RESILIENT END ABUTMENT

The present invention relates to a resilient end abutment, for instance, for use in connection with a shock absorber of a vehicle spring.

It is an object of the present invention so to design such end abutment that it will also be suitable for rough operation and in soiled condition.

This object and other objects and advantages of the invention will appear more clearly from the following specification in connection with the accompanying drawing, in which.

Figure 1:
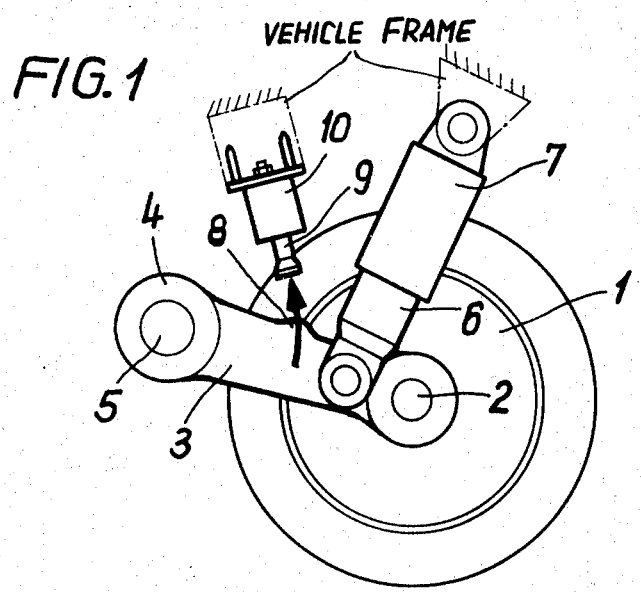
FIG. 1 is a side view of a rocker arm with a shock absorber and an end abutment according to the invention, the rocker arm supporting a wheel.

The resilient end abutment according to the present invention is characterized primarily in that a piston carrying a pushrod is reciprocably guided in a cylinder by means of yieldable material provided at least at the circumference of the cylinder which latter contains the resilient element. The arrangement is such that the pushrod is adapted to assume an inclined position up to a certain degree for example up to 10° or 15°, while a bearing adjacent the cylinder limits the outward movement of the pushrod from the cylinder.

An arrangement as set forth above brings about the advantage that also when the pushrod is eccentrically acted upon, a harmful entering of dirt into the chamber containing the spring element will be avoided. The spring element may, for instance, consist of a metallic helical spring. However, it is also possible to form the spring element of foamed synthetic material the pressure-stroke characteristics of which extend all the steeper the greater the impact velocity will be. Consequently, with shocks of higher kinetic working energy, the required work absorption is realized with approximately the same end force as is the case with shocks of lower kinetic energy so that the feared hard impacts at the end abutment will be avoided.

Expediently, the piston is on that side thereof which faces away from the spring element provided with grooves which extend radially from the circumference of the piston to the pushrod in such a way that dirt particles which have entered between the piston and the bearing on the cylinder will be able to escape through at least one opening in the bearing. The bearing in the form of an annular plate may at that side thereof which faces the piston likewise be provided with grooves whereby the danger of a blocking of the end abutment by dirt particles which have entered the cylinder will also be eliminated even when a particularly large amount of dirt has accumulated.

It is also possible to provide such grooves only in the annular plate.

Referring now to the drawing in detail, the arrangement shown therein comprises a wheel 1 which by means of its shaft 2 is journalled on a rocker arm 3 having a hub 4 journalled in the frame of the vehicle. A torsion spring 5 connected to hub 4 is provided for purposes of shock absorption. Connected to the rocker arm 3 in the vicinity of the shaft 2 there is provided a pushrod 6 of a shock absorber 7 which is linked to the vehicle frame.

When wheel 1 rolls, for instance, over an obstacle and as a result thereof the rocker arm 3 swings upwardly in the direction indicated by the arrow A, first the pushrod 6 of shock absorber 7 will yield. If the returning force of the torsion spring 5 and of the shock absorber 7 are not sufficient to prevent the rocker arm 3 from pivoting upwardly in a manner endangering the shock absorber, a bulge 8 on the top side of the arm 3 will impact upon the pushrod 9 of the end abutment 10 which likewise is connected to and fastened to the vehicle frame.

Figure 2:
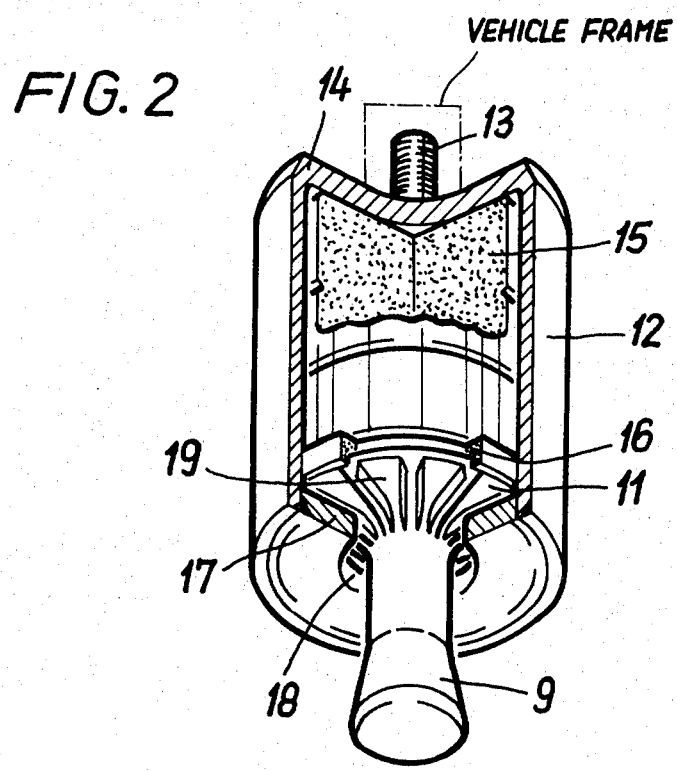
FIG. 2 is an isometric view partially cut open of an end abutment according to the invention.

As will be evident from FIG. 2, the pushrod 9 is connected to a disc piston 11 which is guided in a cylinder 12. Cylinder 12 is by means of a screw 13 fastened to the vehicle frame. The space between the piston 11 and one end face 14 of the cylinder 12 is filled in by a body 15 of foamed synthetic material preferably of foamed polyurethan which body forms the spring element.

The circumference of the disc piston 11 carries a spring 16 of a synthetic material for example of a polyamide, having such a property that it is yieldable to a certain extent and also, when the pushrod is not precisely axially aligned with the cylinder 17, will closely engage the inner wall of the cylinder. Therefore, the end abutment will meet its purpose in a satisfactory manner also when the impacts upon the pushrod 9 do not occur precislely along the central axis and therefore cause a certain slanting of the pushrod 9 relative to the cylinder 12. Also in this instance, in view of the close engagement of spring 16, the entry of dirt into the space of the cylinder which is filled in by the piston 15 will be prevented to such an extent that the life of the resilient body 15 will not be materially reduced by the entered dirt particles. To this end, among others, the entire disc piston 11 may be made of a corresponding yieldable material, for instance, snythetic material such as Polycaprolactam.

Into the lower end of the cylinder 12 there is inserted an annular disc 17 having a circular opening 18 through which the pushrod 9 extends with considerable play. Through this opening dirt can escape which has previously entered the space between the disc piston 11 and the annular disc 17. In order to assure that such escape occurs as completely as possible, the bottom side of the disc piston 11 is provided with radially extending grooves 19. If it is expected that a particularly great amount of dirt will enter, annular disc 17 may have its inner side provided with corresponding grooves. Also additional openings may be provided in the annular disc 17 through which openings entered dirt may escape.

The annular disc 17 may, for instance, be welded into the cylinder 12 after the insertion of the body 15 of synthetic material and of the disc pistons. During the welding operation, the disc piston 11 is pressed into the cylinder 12 as far as possible, and the cylinder mantle is entirely or partly cooled by heat conducting jaws or by a water bath so that the synthetic material of body 15 will not be affected by the welding heat.

The foamed body forming the resilient body 15 has preferably a speed responsive characteristic in such a manner that with high impact velocities the characteristic, i. e., the course of the buffer force over the stroke, is steeper than is the case at lower impact velocities while, however, the end forces at the end of the stroke are approximately of the same magnitude. Consequently, with higher impact velocities, the absorbed kinetic energy is greater so that with a correct dimensioning of the end abutment, also at high impact velocities the much feared harder impacts will be avoided. Such body 15 of foamed material further brings about the advantage that it has a damping effect inherent thereto by which the recoil of the respective part, for instance of the arm 3 the stroke of which is to be limited, will be reduced.

Under some circumstances, it may be expedient to insert the spring element, especially the body 15 of foam material, into the cylinder 12 under a preload. In this way it will be assured that with each spring back of the pushrod, when the latter has taken up an inclined position during a push, the pushrod will be returned to its starting position. The mantle of the cylinder 12 is preferably made of wear-resistant material. The contact surface at the circumference of the disc piston 11 need, with a proper selection of the material, not be lubricated or serviced.

It is, of course, to be understood that the present invention is, by no means, limited to the particular construction shown in the drawing but also comprises any modifications within the scope of the appended claims.

What we claim is:

1. A resilient abutment unit, especially for use in connection with shock absorbers for motor vehicles, which includes: cylinder means having a first and a second closure member respectively arranged at the ends of said cylinder, said first closure member having a bore therethrough, piston means slidably guided in said cylinder and having pushrod means connected thereto and extending through said bore, at least the circumferential area of said piston means which circumferential area slidably engages the interior of said cylinder comprising elastically compressible material to permit said piston means to occupy a slightly inclined position in response to a shock eccentrically acting upon said piston means through said pushrod means, and resilient shock absorbing means located inside said cylinder means and adjacent to said second closure means, that side of said piston means which faces away from said resilient shock absorbing means being provided with groove means which extends radially from the circumferential area of said piston means in the direction toward said pushrod means for discarding dirt which has entered through a gap between said piston and the opening in said first closure member.

2. A resilient abutment unit, especially for use in connection with shock absorbers for motor vehicles, which includes: cylinder means having a first and a second closure member respectively arranged at the ends of said cylinder, said first closure member having a bore therethrough, piston means slidably guided in said cylinder and having pushrod means connected thereto and extending through said bore, at least the circumferential area of said piston means which circumferential area slidably engages the interior of said cylinder comprising elastically compressible material to permit said piston means to occupy a slightly inclined position in response to a shock eccentrically acting upon said piston means through said pushrod means, and resilient shock absorbing means located inside said cylinder means and adjacent to said second closure means, that side of said first closure member which faces said piston means being provided with groove means which extend radially from said first closure member toward said pushrod means for discarding dirt which has entered through a gap between said piston and the opening in said first closure member.

3. A resilient abutment unit, especially for use in connection with shock absorbers for motor vehicles, which includes: cylinder means having a first and a second closure member respectively arranged at the ends of said cylinder, piston means slidably guided in said cylinder and having pushrod means connected thereto and extending through an opening of said first closure member with a considerable play, at least the circumferential area of said piston means which circumferential area slidably engages the interior of said cylinder comprising elastically compressible material to permit said piston means to occupy a slightly inclined position in relation to said cylinder means in response to a shock eccentrically acting upon said piston means through said pushrod means, and resilient shock absorbing means located inside said cylinder means and adjacent to said second closure member.

4. A unit according to claim 3, in which that side of said piston means which faces away from said resilient shock absorbing means is provided with groove means which extend radially from the circumferential area of said piston means in the direction toward said pushrod means for discarding dirt which has entered the space between said piston means and said first closure member.

5. A unit according to claim 3, in which that side of said first closure member which faces said piston means is provided with groove means which extend radially in the direction toward said opening for discarding dirt which has entered the space between said piston means and said first closure member.

* * * * *